United States Patent [19]

Schneider

[11] Patent Number: 4,781,514
[45] Date of Patent: Nov. 1, 1988

[54] MATERIAL HANDLING VEHICLE LOAD RETENTION APPARATUS

[75] Inventor: David A. Schneider, Mantua, Ohio

[73] Assignee: X Caterpillar Industrial Inc., Mentor, Ohio

[21] Appl. No.: 43,005

[22] Filed: Apr. 27, 1987

[51] Int. Cl.[4] ............................................. B60P 1/52
[52] U.S. Cl. .................................... 414/520; 414/529
[58] Field of Search ............................. 414/527–536, 414/519, 520, 345; 193/32, 35 A, 40; 198/463.4, 463.6, 633

[56] References Cited

U.S. PATENT DOCUMENTS

| | | | |
|---|---|---|---|
| 2,087,846 | 7/1937 | Jahn | 414/529 |
| 2,498,989 | 2/1950 | Erland et al. | 198/633 X |
| 2,762,487 | 9/1956 | Temple | 198/463.4 |
| 2,904,196 | 9/1959 | Teixeira | 414/534 |
| 3,561,625 | 2/1971 | Dioguardi et al. | 414/536 X |
| 3,684,108 | 8/1972 | Olson | 414/531 |
| 4,541,768 | 9/1985 | Walker et al. | 414/536 X |
| 4,565,483 | 1/1986 | Huelster et al. | 414/529 X |

Primary Examiner—Joseph E. Valenza
Assistant Examiner—David A. Bucci
Attorney, Agent, or Firm—Alan J. Hickman

[57] ABSTRACT

Load retention devices for material handling vehicles are inadequate in maintaining load position and inflexible in load transfer operations. First and second blocking devices having elevationally movable gates are mounted adjacent opposite sides of the frame of a material handling vehicle and adjacent a load supporting apparatus. The first and second gates are guided for elevational movement between a first position above the load supporting apparatus at which a load on the load supporting apparatus is blocked from side passing movement and a second position beneath the load supporting apparatus at which the load is free to pass the first and second sides. A first power device is provided for selectively moving the first gate member between the first and second elevational positions and a second power device is provided for selectively moving the second gate between the first and second positions. Due to the flexibility in operation of the first and second blocking devices they are particularly suited for use on automatic guided vehicles.

12 Claims, 4 Drawing Sheets

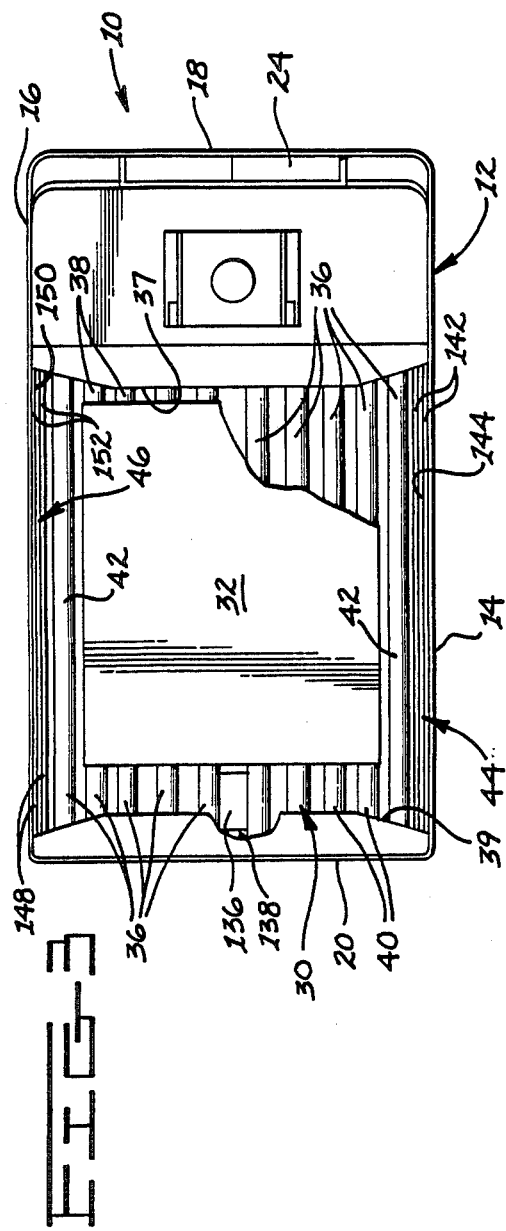
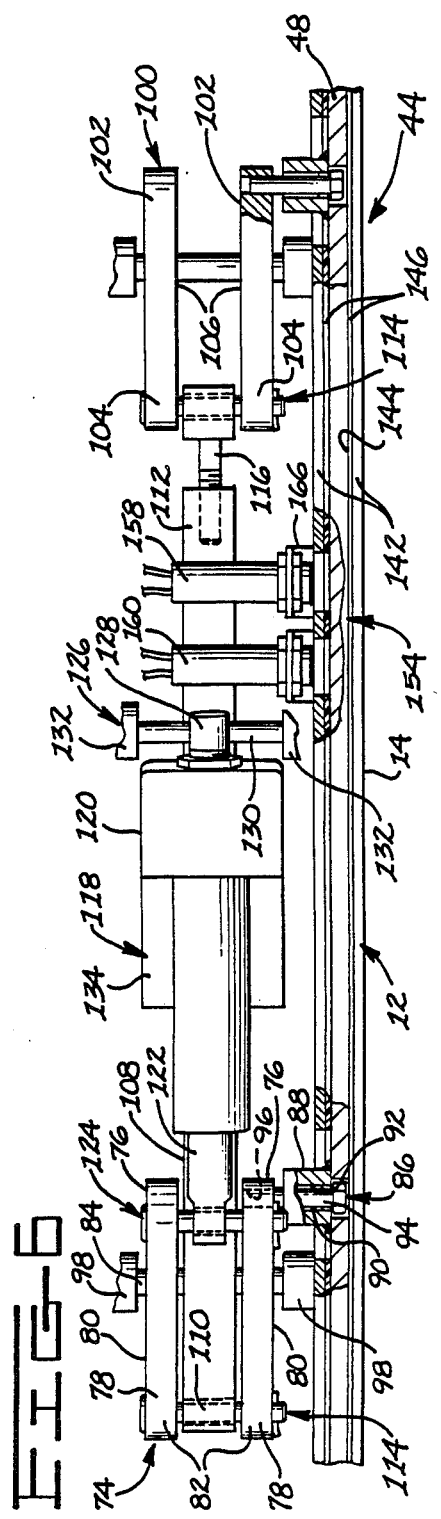

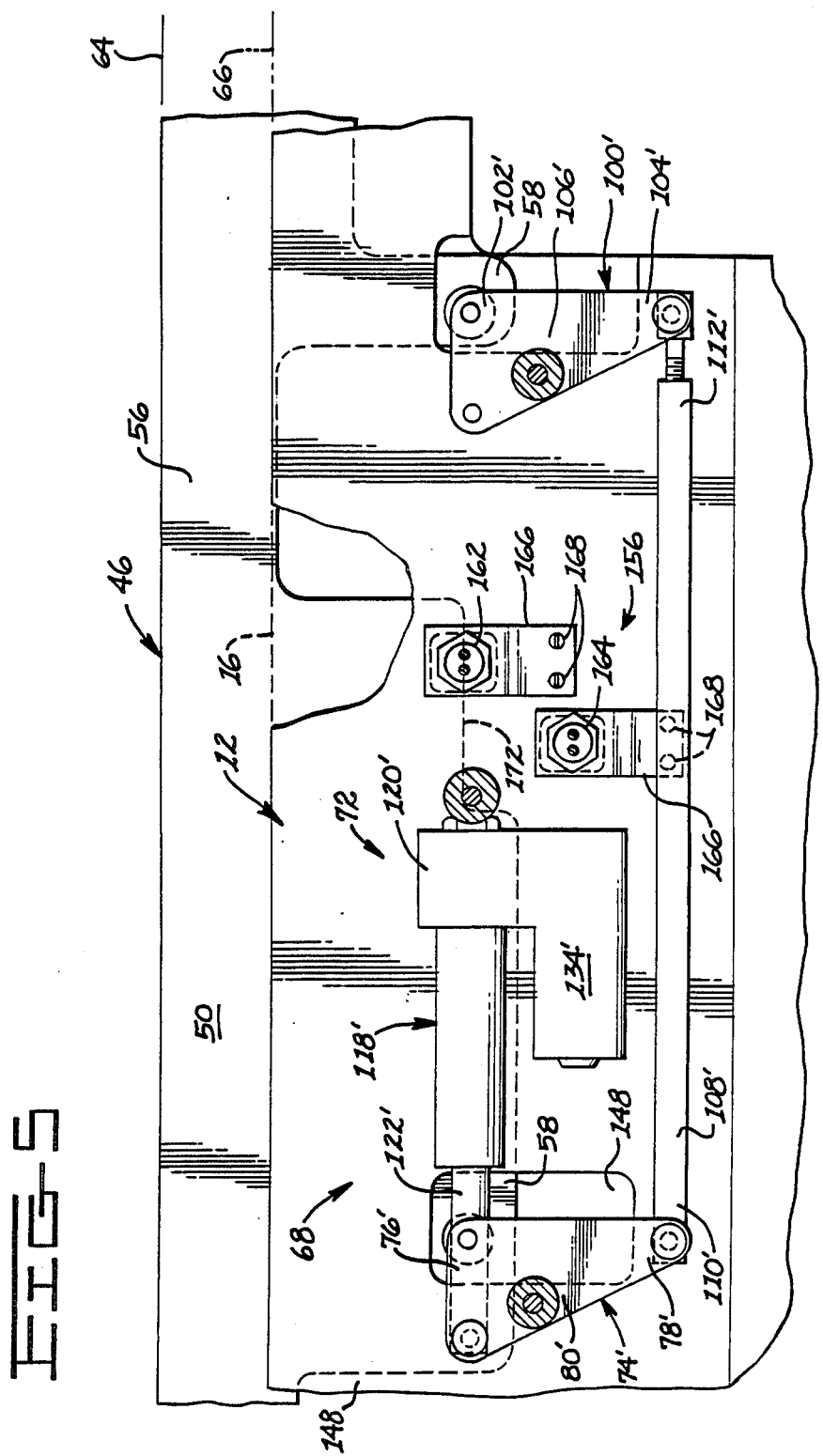

MATERIAL HANDLING VEHICLE LOAD RETENTION APPARATUS

DESCRIPTION

1. Technical Field

This invention relates to a device for retaining a load on a supporting apparatus of a material handling vehicle, and more particularly to a material handling vehicle having first and second spaced apart sides, a load supporting apparatus, and first and second spaced apart load blocking devices which are movable between a first position at which the load is blocked and a second position at which the load is free to move on the load supporting apparatus in a passing relationship relative to the first and second sides.

2. Background Art

Material handling vehicles and particularly automatic guided material handling vehicles have an apparatus for supporting a load on the vehicle. The load supporting apparatus may include a stationary load carrying horizontal deck, an elevationally movable horizontal load carrying deck, a horizontal roller deck having freely rotatable rollers, a powered horizontal roller deck having rollers with a single direction of rotation, a single direction of operation conveyor deck, and the like. Typically, the load supporting apparatus supports a load on the vehicle and permits transportation of the load between pick up and deposit locations for machining, storing, assembly and the like purposes. During transportation of the load between pickup and deposit locations there exists a significant potential for the load to inadvertently move due to vibration, impact, tipping, and the like of the vehicle. This movement results in inaccurate and unidentified load positioning on the vehicle which is detrimental to accurate and acceptable load transfer between an accurately docked vehicle and the deposit site. This is especially the case in flexible manufacturing systems, automated storage and retrieval systems, and the like where automated guided vehicles (driverless computer controlled vehicles) are utilized. Systems such as these are intolerant to load movement that is uncontrolled, unidentified, and of a magnitude greater than a preselected amount. This is due to the fact that any deviation in the position of the load on the vehicle greater than the preselected amount will not permit proper alignment between the load and the load transfer station. Because automated systems do not have a vehicle operator to correct and adjust the position of the vehicle relative to the docking location the accuracy of load position is of great importance. Therefore, it is important that the amount of free movement of the load be limited to an amount within an acceptable tolerance range while permitting transfer of the load on the load supporting apparatus between the vehicle and the load transfer station.

Material handling vehicles having a load supporting apparatus for example; powered roller decks, unpowered roller decks, powered conveyor decks, and the like have been known to have a stop rigidly and fixedly mounted on the material handling vehicle adjacent a first side of the vehicle, to eliminate the potential for a load carried on the vehicle from inadvertently exiting the vehicle from the first side adjacent the stop. These transporting decks facilitate and direct the transfer of the load in a first direction toward a second side of the vehicle opposite the first side, past the second side, and onto a load transfer station such as a stand, rack, conveyor, machining table, and the like. Conversely, these load supporting apparatuses permit the transfer of a load from the load transfer station, past the second side of the vehicle, and onto the load supporting apparatus of the vehicle for transportation purposes. However, the rigid stop prevents a load from exiting the vehicle at the first side or being received by the vehicle from the first side. This greatly reduces the flexibility of operation of the automated system because the vehicle must always have the second vehicle side face the load transfer station. Therefore, additional time is required to properly position the vehicle which increases costs of operation and ultimately the finished product. It is advantageous that a vehicle of this type is capable of passing the load on either side.

Whenever a single fixed stop is provided there is the potential for the load carried on the deck to shift due to operational vehicle dynamics which may result in inadvertent load movement with the potential for excessive load displacement, a condition wherein the load partially extends past the second vehicle side (the unblocked side). Although automatic guided vehicles normally travel at speeds which are considered to slow and inadequate to cause excessive load displacement it would be advantageous to make provisions to prevent such a happening from taking place. Excessive load displacement is detrimental to the operation of an automatic guided vehicle for several reasons including; load alignment, maneuverability, stability, durability, efficiency of operation and the like and should be avoided.

The present invention is directed to overcoming one or more of the problems as set forth above.

DISCLOSURE OF THE INVENTION

In one aspect of the present invention, a material handling vehicle having a frame with first and second spaced apart sides and a means for supporting a load on the frame at a location between the first and second spaced apart sides is provided. A first means blocks movement of the load on the supporting means in a first direction transverse and in passing relationship relative to the first side, and a second means blocks movement of the load on the supporting means in a second direction transverse and in passing relationship relative to the second side. A power means elevationally moves the first and second blocking means between a first position at which the load is blocked from side passing movement in the first and second directions on the supporting means and a second position at which the load is free to move past the first and second sides in the first and second directions on the supporting means.

In another aspect of the present invention an automatic guided material handling vehicle having a frame which has first and second spaced apart sides and a plurality of rollers rotatably connected to the frame and defining a supporting surface plane is provided. The rollers are adapted to guide movement of a load supported on the rollers in a first direction transverse the first side and in a second direction transverse the second side. A first gate member having upper and lower end portions is connected to the frame at a location adjacent the first side and a second gate member having upper and lower end portions is connected to the frame at a location adjacent the second side. A first power means elevationally moves the first gate member between a first position at which the upper end portion of the first gate member extends elevationally above the supporting surface plane and a second position at which the first gate member upper end portion is elevationally below the supporting surface plane. A second power means elevationally moves the second gate member between a first position at which an upper end portion of the second gate member extends elevationally above the supporting surface plane and a second position at which the second gate member upper end portion is elevationally below the supporting surface plane.

BRIEF DESCRIPTION OF THE DRAWINGS

FIG. 3 is a diagrammatic top elevational view taken along lines III—III of FIG. 2 showing the load supporting means, and first and second gate members adjacent the first and second vehicle sides, respectively, and in greater detail;

FIG. 5 is a partial diagrammatic side elevational view taken along lines V—V of FIG. 2 with portions broken away showing a second power means for elevationally moving the second gate member, a second sensing means for sensing the elevational position of the second gate member, and showing the second gate member at the first elevated position in solid lines and at the second elevated position in phantom lines; and FIG. 6 is a top elevational view taken along lines VI—VI of FIG. 4 showing the second power means, second gate member, first and second sensing means, and elements defining a second guideway in greater detail.

BEST MODE FOR CARRYING OUT THE INVENTION

Figure 1:
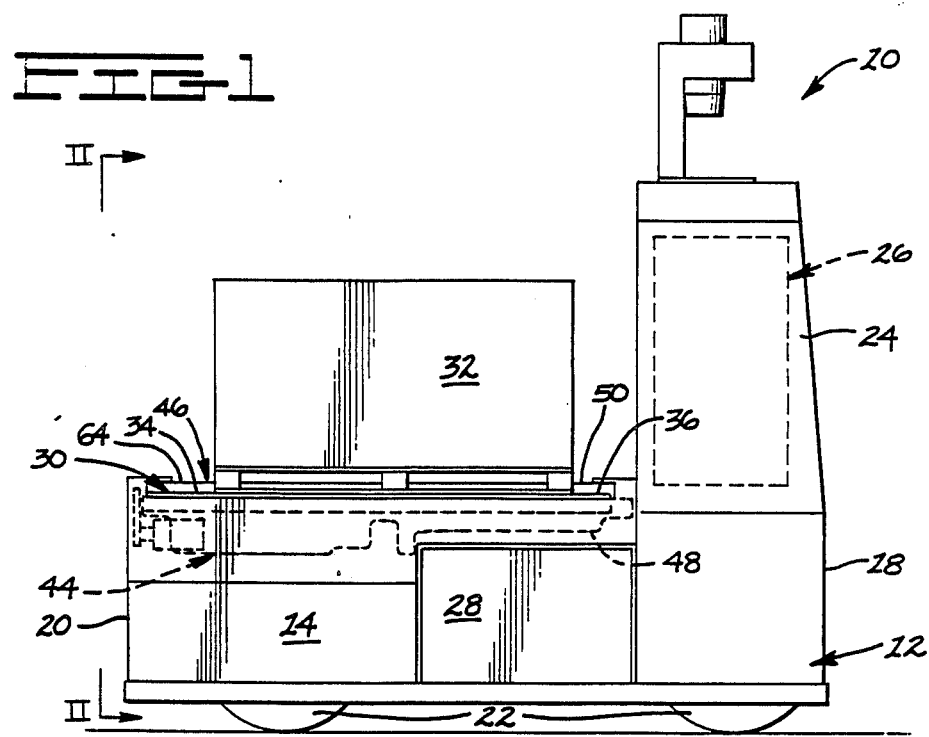
FIG. 1 is a diagrammatic side elevational view of an embodiment of the present invention showing an automatic guided material handling vehicle, a load supporting means on the vehicle, a load on the load supporting means, a first gate member at a second position on the vehicle at which the load is free to pass a first vehicle side, and a second gate member at a first position at which the load is blocked from passing the second vehicle side.
Figure 2:
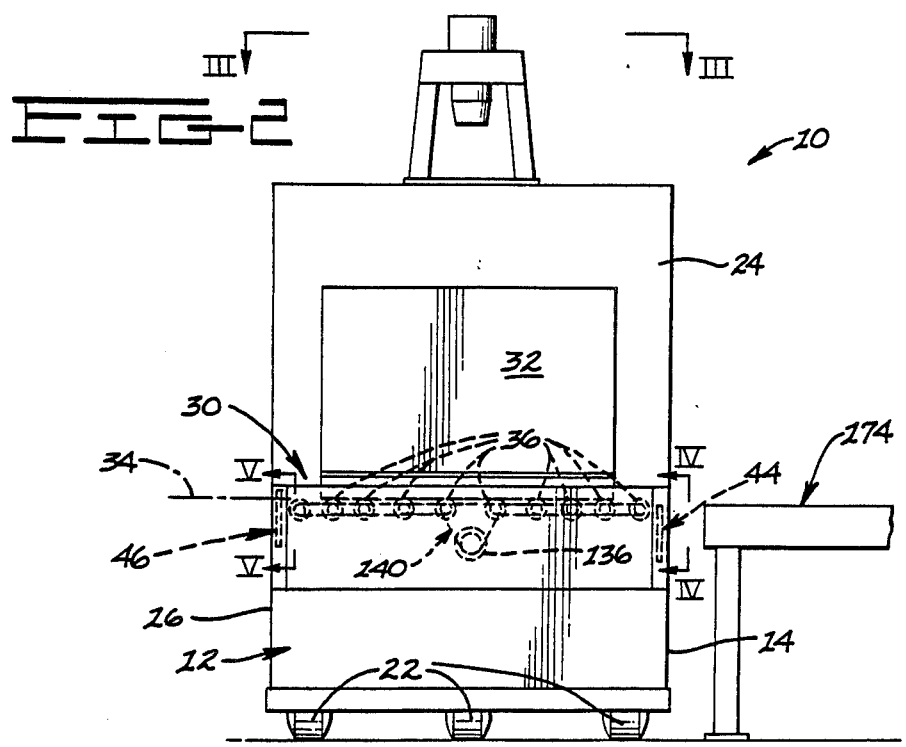
FIG. 2 is a diagrammatic rear elevational view taken along lines II—II of FIG. 1 showing the vehicle in greater detail, and showing a load transfer station positioned adjacent the vehicle first side for receiving the load carried on the vehicle.

With reference to the drawings, and in particular FIGS. 1-3, a material handling vehicle 10 having a frame 12, first and second spaced apart sides 14,16, and front and rear end portions 18,20 is shown. The material handling vehicle depicted is driverless, computer controlled, and often referred to as an automatic guided vehicle (AGV). It should be noted that the invention is particularly suited for use on a free ranging AGV but should not be limited to this use as it is suitable for use on other material handling vehicles for example, driver operated material handling carriers, and transporters, towed trailers, wire, and stripe following automatic guided vehicles, and the like.

The vehicle 10 has a plurality of ground engaging wheels 22 which are rotatably connected to the frame 12 and a tower portion 24 which houses an on board control system 26 capable of controlling vehicle drive functions, navigation functions, load manipulation functions, and the like. A source of power 28, for example, a storage battery is provided for powering the vehicle drive system (not shown), as well as the control system 26, and other vehicle systems.

A means 30 is provided for supporting a load 32 on the frame 12 at a location between the first and second sides 14,16. The load supporting means 30 defines a supporting surface plane 34 which extends at an angle to the first and second sides 14,16. Preferably, the load supporting means 30 includes a plurality of elongate consecutively arranged rollers 36 having first and second spaced apart end portions 38,40, and a cylindrical outer surface 42. The rollers 36 are each rotatably connected at the first and second end portions 38,40 to the frame 12 at spaced apart locations on the frame 12, are oriented so that the outer cylindrical surfaces 42 are substantially parallel to each other and to the first and second gate members 48,50, and extend transverse the front and rear frame end portions 18,20. It is to be noted that the load supporting means 30 may include other embodiments, for example, stationary decks, elevationally movable decks, conveyor decks, and the like without departing from the spirit of the invention. The rollers 36 suitably guide movement of the load 32 in a first direction transverse the first side 14 and in a second direction transverse the second side 16. To insure this motion and limit load movement in directions towards the front and rear vehicle end portions 18,20, tapered guides 37,39 are provided adjacent the first and second end portions 38,40, respectively, of the rollers 36.

Figure 4:
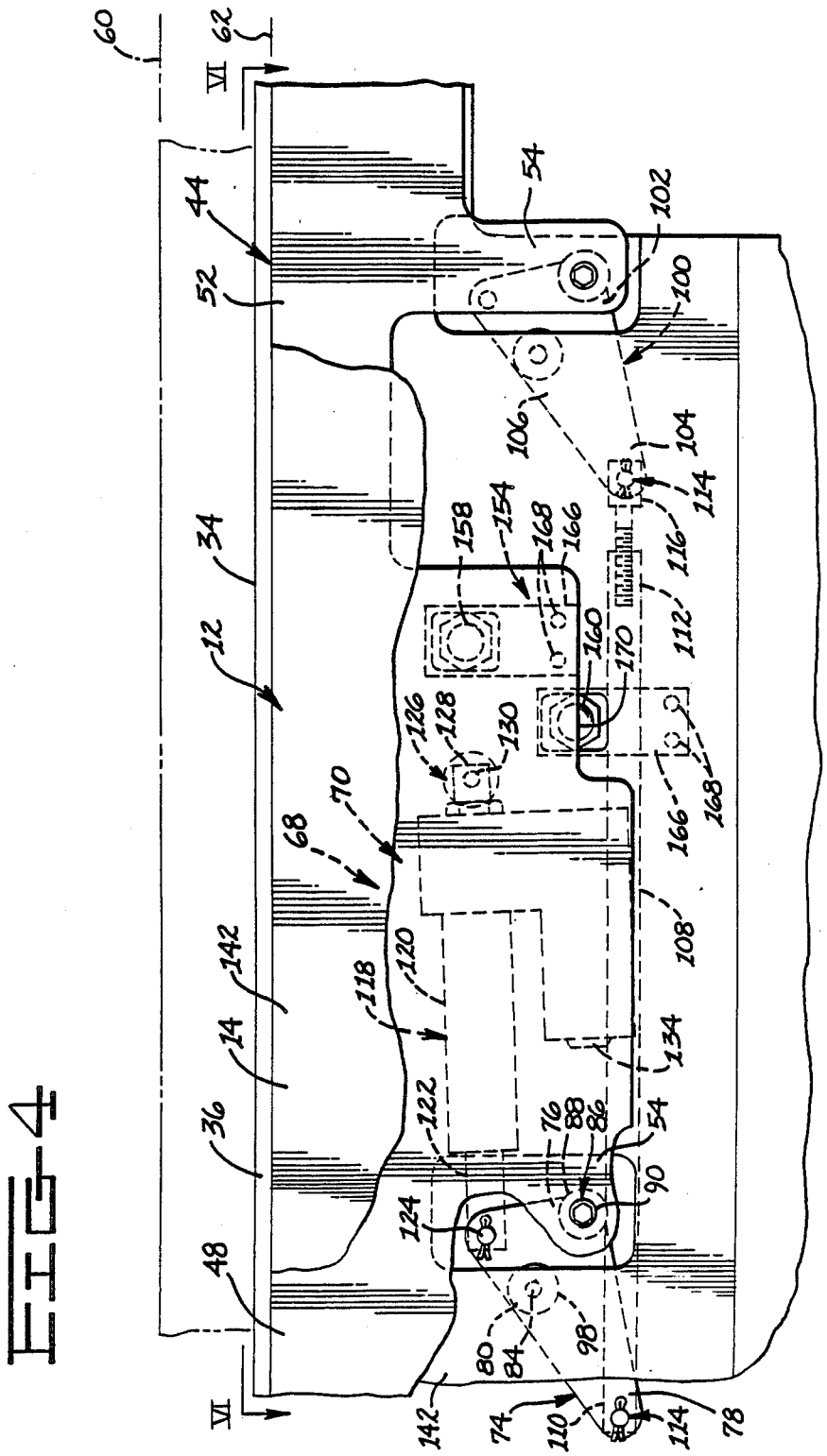
FIG. 4 is a partial diagrammatic side elevational view taken along lines IV—IV of FIG. 2 with portions broken away showing a first power means for elevationally moving the first gate member, a first sensing means for sensing the elevational position of the first gate member, and showing the first gate member at the second elevated position in solid lines and at the first elevated position in phantom lines.

A first means 44 is provided for blocking movement of the load 32 on the load supporting means 30 in a first direction transverse and in passing relationship relative to the first side 14, and a second means 46 is provided for blocking movement of the load 32 on the load supporting means 30 in a second direction transverse and in passing relationship relative to the second side. The first and second blocking means 44,46 include first and second gate members 48,50, respectively. As best seen in FIGS. 4,6 the first gate member 48 has an upper end portion 52 and a lower end portion 54, and as best seen in FIG. 5, the second gate member 50 has an upper end portion 56 and a lower end portion 58.

Refering to FIGS. 3-6, the first gate member 48 is connected to the frame 12 at a location adjacent the first side 14 and is elevationally movable relative to the frame first side 14. Similarly, the second gate member 50 is connected to the frame 12 at a location adjacent the second side 16 and is elevationally movable relative to the second side 16. A power means 68 elevationally moves the first blocking means 44 between a first position 60 at which the load 32 is blocked from movement in the first direction in passing relationship relative to the first side 14 on the supporting means 30 and a second position 62 at which the load 34 is free to move in the first direction in passing relationship relative to the first side 14 on the supporting means 30, and elevationally moves the second blocking means 46 between a first position 64 at which the load 32 is blocked from movement in the second direction in passing relationship relative to the second side 16 on the supporting means 30 and a second position 66 at which the load 34 is free to move in the second direction in passing relationship relative to the second side 16 on the supporting means 30. More particularly the first gate upper end portion 52 extends above the supporting surface plane 34 at the first position 60 of the first blocking means 44 and is elevationally beneath the supporting surface plane 34 at the second position 62 of the first blocking means 44. Similarly, the second gate upper end portion 56 extends above the supporting surface plane 34 at a first position 64 of the second blocking means 46 and the second gate upper end portion 56 is elevationally beneath the supporting surface plane 34 at a second position 66 of the second blocking means 46.

As shown in FIGS. 4,5, and 6 the power means 68 includes but is not limited to first and second power means 70,72. The first power means 70 is provided for moving the first gate member 48 between the first and second positions 60,62 and the second power means 72 is provided for moving the second gate member 50 between the first and second positions 64,66.

As best seen in FIGS. 4 and 6 the first power means 70 includes a first lever assembly 74 having first and second spaced apart end portions 76,78 and a middle portion 80 located between the first and second end portions 76,78. The first lever assembly 74 preferably includes a pair of spaced apart aligned bellcranks 82 rigidly secured to each other at the middle portion 80 by a pivot shaft 84 welded to the bellcranks 82. The first lever assembly 74 is pivotally connected at the first end portion 76 to the lower end portion 54 of the first gate member 48 by a pin assembly 86. The pin assembly 86 includes a boss 88 welded to the first gate lower end portion 54, a bushing 90 disposed in an aperture 92 in the boss 88, and a pin 94 disposed in a bore 96 disposed in the first lever assembly first end portion 76 and secured thereto. The pivot shaft 84 pivotally connects the first lever assembly at the middle portion 80 to the frame 12 by a pair of spaced apart bearing assemblies 98.

The first power means 70 includes a second lever assembly 100 having first and second spaced apart end portions 102,104 and a middle portion 106 located between the first and second end portions 102,104. The second lever assembly 100 is identical in construction to the first lever assembly 74 and is pivotally connected at the first end portion 102 to the lower end portion 54 of the first gate member 48 in a manner identical to the first end portion 76 of the first lever assembly 74. Likewise the middle portion 106 of the second lever assembly 100 is pivotally connected to the frame 12 in an identical manner as the middle portion 80 of the first lever assembly 74. The pivotal connections of the first and second lever assemblies first end portions 76,102 are at spaced apart locations on the lower end portion 54 of the first gate member 52 and the pivotal connections of the middle portions 80,106 to the frame 12 are at spaced apart locations on the frame 12 and adjacent the first gate member 52.

The first power means 70 has a tie rod 108. The tie rod 108 which has first and second spaced apart end portions 110,112 is pivotally connected at the first end portion 110 to the second end portion 78 of the first lever assembly 74 and the tie rod second end portion 112 is pivotally connected to the second end portion 104 of the second lever assembly 100. The tie rod 108 is preferably disposed between the pair of bellcranks 82 of each lever assembly 74,100. The pivotal connections of the tie rod 108 first and second end portions 110,112 are accomplished by a pin assembly 114 in a conventional manner. The tie rod 108 insures uniformity in movement of the first and second lever assemblies 74,100, establishes the distance between the first and second lever assemblies second end portions 78,104, and determines the relative position of the first and second link assemblies 74,100. In order to permit fine tuning of the attitude and distance between the first and second lever second end portions 78,104 a screw threadable adjustor 116 is provided at the tie rod second end portion 112.

The first power means 70 includes a linear actuator 118 having a housing 120 and a rod 122 slidably connected to the housing 120 and telescopically movable relative to the housing 120. The rod 122 is pivotally connected to the first lever assembly 74 first end portion 76 at a location on the first end portion 76 spaced from the connection with the first gate member 52 by a pin assembly 124 of conventional design. The rod 122 is disposed between the pair of spaced apart bellcranks 82 of the first lever assembly at this connection. A housing mounting assembly 126 pivotally connects the housing 120 to the frame 12 at a location on the frame 12 near the first gate member 52. The housing mounting assembly 126 has a protrusion 128 which extends from the housing 120 in a direction opposite the rod 122 and a pin 130 which is transversely disposed relative to the protrusion 128 and connected to the protrusion in any suitable manner. The pin 130 is pivotally connected to the frame 12 in any suitable manner, for example, by a pair of spaced apart bearing assemblies 132.

The second power means 72 is an identical mirror image of the first power means 70. Therefore, the second power means 72 will not be discussed in any great detail. However, elements of the second power means 72 not previously discussed will be identified with the same reference numerals as the first power means 70 but, with a prime following the numeral.

The second power means 72 includes a first lever assembly 74', second lever assembly 100', a tie rod 108' and a linear actuator 118'. The first lever assembly 74' has first and second end portions 76',78' and a middle portion 80'. The first lever assembly 74' is pivotally connected at the first end portion 76' to the lower end portion 58 of the second gate member 50 and is pivotally connected at the middle portion 80' to the frame 12. The second lever assembly 100' has first and second end portions 102',104' and a middle portion 106' and is pivotally connected at the first end portion 102' to the lower end portion 58 of the second gate member 50 at a location on the second gate member second end portion 58 spaced from the pivotal connection of the first lever assembly first end portion 76'. The second lever assembly middle portion 106' is pivotally connected to the frame 12. The connections of the middle portions 80',106' to the frame 12 are at spaced apart locations on the frame 12 next to the frame second side 16 and adjacent the second gate member 50. It is to be noted that these connections are made in a manner identical to those of the first power means 70.

The tie rod 108' has first and second spaced apart end portions 110',112' and is pivotally connected at the first end portion 110' to the second end portion 78' of the first lever assembly 74' and at the second end portion 112' to the second end portion 104' of the first lever assembly 100'. It is to be mentioned that these pivotal connections are made in a manner identical to those of the first power means 70.

The linear actuator 118' of the second power means 72 has a housing 120' and a rod 122' slidably connected to the housing 120' and extensibly movable relative to the housing 120'. The rod 122' is pivotally connected to the first end portion 76' of the first lever assembly 74' at a location on the first end portion 76' spaced from the pivotal connection of the first end portion 76' with the second gate member 50. The housing 120' is pivotally connected to the frame 12 at a location on the frame 12 near the second side 16 and adjacent the second gate member 50. These pivotal connections are made in a like manner as those of the linear actuator 118 of the first power mean 70.

The first and second power means 70,72 include identical motors 134,134', respectively. The motors 134,134' are preferably electric, but fluid operated motors are considered suitable substitutes and within the scope of the invention. Motor 134 is mounted on housing 120 and drivingly connected to the rod 122 in any suitable and well known manner such as by gearing, fluid coupling, and the like, and motor 134' is mounted on housing 120' and drivingly connected to the rod 122' in the same manner. The rods 122,122' are extensibly moveable in response to actuation of their respective motors 134,134' to move the first and second gate members 48,50 between the first and second positions. The motors 134,134' are connected to power source 28 and the control system 26. The control system controls each motor 134,134' and provides for individual and dual operation in response to pre-programmed instructions.

A roller drive motor 136 which is connected to the power source 28, controlled by the system 26, and mounted on the frame 12 is provided. The roller drive motor has an output shaft 138 connected to a chain and sprocket arrangement 140 of conventional design. The chain and sprocket arrangement is connected to the rollers 36 in any manner suitable for transmitting rotary motion from the shaft 138 to rotary motion of the rollers 36. The rollers 36 are rotatable about the first and second roller end portions 38,40 in response to rotation of the motor output shaft 138. The roller drive motor 136 is preferably a reversible electric motor capable of driving the rollers 36 in either clockwise or counterclockwise directions. The direction of rotation of the roller drive motor 136 and ultimately the rollers 36 is established by the control system 26.

The frame first side 14 includes a first pair of spaced apart substantially parallel support members 142 which define a first guideway 144 therebetween. The first gate member 48 which is preferably a flat steel plate, is slidably disposed in the first guideway 144 between the first pair of support members 142. A first pair of bearing pads 146 are disposed in the first guideway 144 and connected to the first pair of support members 142, respectively. The first pair of bearing pads 146 are preferably constructed of a nonmetalic plastic material and connected to the first pair of support members 142 in any suitable manner. The first gate member 48 is disposed between the first pair of bearing pads 146, bears against the first pair of bearing pads 146, and is slidably guided by the first pair of bearing pads 146.

The frame second side 16 includes a second pair of spaced apart substantially parallel support members 148 which define a second guideway 150 therebetween. The second gate member 50 which is preferably a flat steel plate, is slidably disposed in the second guideway 150 between the second pair of support members 148 A second pair of bearing pads 152 are disposed in the second guideway 150 and connected to the second pair of support members 148, respectively. The second pair of bearing pads 152 are preferably constructed of a nonmetalic plastic material and connected to the second pair of support members 148 in any suitable manner. The second gate member 50 is disposed between the second pair of bearing pads 152, bears against the second pair of bearing pads 152, and is slidably guided by the second pair of bearing pads 152.

A first sensing means 154 senses the elevational position of the first gate member 48 and delivers a first signal in response to the first gate member 48 being at the first position 60 and a second signal in response to the first gate 48 member being at the second position 62. A second sensing means 156 of construction identical to the first sensing means 154 senses the elevational position of the second gate member 50 and delivers a first signal in response to the second gate member 50 being at the first position 64 and a second signal in response to the second gate member being at the second position 66.

The first sensing means 154 has first and second inductive proximity sensors 158,160 which are each capable of delivering a signal and receiving a reflection of the delivered light signal. The first inductive proximity sensor 158 is located on the frame 12 at a position on the frame 12 adjacent the lower end portion 54 of the first gate member 48 at the first position 60 of the first gate member 48, and the second inductive proximity sensor 160 is located on the frame 12 at a position on the frame 12 adjacent the lower end portion 54 of the first gate member 48 at the second position 62 of the first gate member 48.

The second sensing means 156 like the first sensing means 154 has first and second inductive proximity sensors 162,164 which are each capable of delivering a light signal and receiving a reflection of the light signal. The first inductive proximity sensor 162 is located on the frame 12 at a position on the frame 12 adjacent the lower end portion 54 of the second gate member 50 at the first position 64 of the second gate member 50, and the second inductive proximity sensor 164 is located on the frame 12 at a position on the frame 12 adjacent the lower end portion 54 of the second gate member 50 at the second position 64 of the second gate member 50. The first and second inductive proximity sensors 158,162,160,164 are connected to the frame in any suitable manner, such as by brackets 166 and fasteners 168.

The first gate member 48 has a sensing edge 170 located on its lower end portion 54 and the second gate member 50 has a sensing edge 172 on its lower edge portion. The sensing edges 170,172 are elevationally aligned with the first inductive proximity sensors 158,162, respectively, to interrupt a portion of the light signal of the respective first inductive proximity sensors 158,162 at the first positions 60,64 of the first and second gate members 48,50, respectively. The sensing edges 170,172 are also elevationally aligned with the second inductive proximity sensors 160,164, respectively, to interrupt a portion of the signal of the respective second inductive proximity sensors 160,164 at the second positions 62,66 of the first and second gate members 48,50, respectively.

The first inductive proximity sensors 158,162 each deliver a control signal to the control system 26 in response to the gate members 48,50 being at the first positions 60,64 and the second inductive proximity sensors 160,164 each deliver a control signal to the control system 26 in response to the gate members 48,50 being at the second positions 62,66. The control system 26 responds to these signals in a pre-programmed manner and controls operation of the vehicle 10, rollers 36, gate members 48,50 and the like in order to transfer the load 32 between the vehicle 10 and a load transfer station 174.

Industrial Applicability

With reference to the drawings, and in operation, the automatic guided vehicle 10 follows the pre-programmed instructions of the onboard control system 26 as well as instructions transmitted to the vehicle from a remote controller (not shown). In response to these instructions, the vehicle 10 carries out its loading and unloading functions, as well as transporting the load 32 between load transfer stations 174.

Assuming a load 32 on the vehicle 10, the control system 26 receives signals from the first and second sensing means 154,156 indicating that the first and second gate members 48,50 are in the first position 60,64. Because the load 32 is blocked from passing the first and second sides 14,16 of the vehicle 10, the control system 26 will enable the vehicle 10 to transport the load 32 to a preselected destination within the facility. As the vehicle 10 approaches the load transfer station 174 communication between the load transfer station 174 and the vehicle 10 are established which results in accurate positioning of the supporting means 34 and the load transfer station 174. Because the load 32 was maintained on the supporting means 34 between the vehicle sides 14,16 by the gate members 48,50 the ability to maneuver close to the load transferring station 174 without interference is made possible. Stated another way, the position of the load on the vehicle is controlled within preselected limits so that accurate load transfer may take place.

As previously noted, the tower portion 24 and the rear end portion 20 of the frame 12 extend elevationally above the supporting means 30 and establish boundaries which limits load movement in directions toward the front and rear end portions 18,20 of the vehicle 10. They also serve to assist the supporting means 34 and particularly a roller deck 36, in guiding the load 32 transversely of the first and second gate members 48,50.

After the vehicle 10 is properly docked and the load supporting means 30 is aligned with the load transfer station 174, control system 26 actuates linear actuator 118 which lowers the first gate member 48 to the second position 62. At this position 62 the load 32 is free to be transferred past the first side 14 and on to the load transfer station 174. The first sensing means 154 determines when the first gate member 48 is at the second position, i.e.; when the second inductive proximity sensor 160 and the sensing edge 170 are aligned, and delivers a control signal to the control system 26. As a result, the roller drive motor 136 is actuated to rotate in a preselected direction as established by the first gate member 48 being at the second position 62 and the vehicle 10 being successfully docked which rotates the rollers 36 and transfers the load 32. Upon completion a successful load transfer the roller drive motor 136 is stopped and the linear actuator 118 is actuated to raise the first gate member 48 to the first position 60.

Because the first and second blocking means 44,46 are each movable between the first and second positions 60,62,64,66 as determined by pre-programmed instructions and in accordance with certain established parameters. The capability of transferring and receiving the load 32 past either the first and second sides 14,16 is possible. As a result speed and flexibility not present in flexible manufacturing and assembly systems, and automated storage an retrieval systems currently available is made possible.

Other aspects, objects and advantages of this invention can be obtained from a study of the drawings, the disclosure and the appended claims.

I claim:

1. A material handling vehicle, comprising:
   a frame having first and second spaced apart sides;
   means for supporting a load on said frame at a location between said first and second spaced apart sides, said load supporting means defining a supporting surface plane;
   first means for blocking movement of the load on said load supporting means in a first direction transverse and in passing relationship relative to said first side, said first blocking means having a gate member, said first blocking means gate member having upper and lower end portions and being movably connected to the frame adjacent the frame first side, said upper end portion of the first blocking means gate member extending above the supporting surface plane at a first position of said first blocking means and being disposed beneath the supporting surface plane at a second position of the first blocking means;
   second means for blocking movement of the load on said load supporting means in a second direction transverse and in passing relationship relative to the second side, said second blocking means having a gate member, said second blocking means gate member having upper and lower end portions and being movably connected to the frame adjacent said frame second side, said upper end portion of the second blocking means gate member extending above the supporting surface plane at the first position of the second blocking means and being disposed beneath the supporting surface plane at the second position of the second blocking means;
   a first power means for moving the first blocking means gate member between the first position at which said load is blocked from side passing movement in said first direction on said load supporting means and the second position at which said load is free to move in side passing relationship in said first direction on said load supporting means, said first power means having a first lever assembly, a second lever assembly, a tie rod and a linear actuator, said first lever assembly having first and second end portions and a middle portion, said first lever assembly being pivotally connected at the first lever assembly first end portion to the lower end portion of the first blocking means gate member and being pivotally connected at the middle portion to the frame, said second lever assembly having first and second end portions and a middle portion, said second lever assembly being pivotally connected at the second lever assembly first end portion to the lower end blocking means gate member spaced from the first lever assembly first end portion and said second lever assembly middle portion being pivotally connected to the frame, said tie rod having first and second spaced apart end portions and being pivotally connected at the tie rod first end portion to the second end portion of the first lever assembly and being pivotally connected at the tie rod second end portion to the second end portion of the second lever assembly, said linear actuator having a housing and a rod, said rod being slidably connected to the housing and extensibly movable relative to the housing, said rod being pivotally connected to the first lever assembly and said housing being connected to the frame; and a second power means for moving the second blocking means gate member between a first position at which said load is blocked from side passing movement in said second direction on said load supporting means and a second position at which said load is free to move in side passing relationship in said second direction on said load supporting means.

2. A material handling vehicle, as set forth in claim 1 wherein said second power means includes:

a first lever assembly having first and second end portions and a middle portion, said first lever assembly being pivotally connected at the first end portion to the lower end portion of the second blocking means gate member and being pivotally connected at the middle portion to the frame;

a second lever assembly having first and second end portions and a middle portion, said second lever assembly being pivotally connected at the second lever assembly first end portion to the lower end portion of the second blocking means gate member at a location on the second blocking means gate member spaced from the connection of the first lever assembly first end portion, said second lever assembly middle portion being pivotally connected to the frame;

a tie rod having first and second spaced apart end portions and being pivotally connected at the tie rod first end portion to the second end portion of the first lever assembly and being pivotally connected at the tie rod second end portion to the second end portion of the second lever assembly;

a linear actuator having a housing and a rod, said rod being slidably connected to the housing and extensibly movable relative to the housing, said rod being pivotally connected to the first lever assembly and said housing being mounted on the frame.

3. A material handling vehicle, as set forth in claim 1, wherein said first and second power means each include a motor, said motor of the first power means being mounted on the housing of the linear actuator of the first power means and being drivingly connected to the rod of the linear actuator of the first power means and said motor of the second power means being mounted on the housing of the linear actuator of the second power means and being drivingly connected to the rod of the linear actuator of the second power means, said motors being connected to a power source.

4. A material handling vehicle, as set forth in claim 1, wherein said load supporting means includes a plurality of consecutively arranged elongated rollers each having first and second spaced apart end portions and an outer cylindrical surface, said rollers being rotatably connected at said first and second end portions to the frame, said outer cylindrical roller surfaces being substantially parallel to each other and to said first and second gate members, said outer cylindrical roller surfaces have a longitudinal line of tangency defining said supporting surface plane and said supporting surface plane being oriented to intersect at an angle the first and gate members.

5. A material handling vehicle, as set forth in claim 4, wherein said rollers are powered by a roller drive motor and rotatable about said roller first and second end portions in response to rotation of said roller drive motor, said roller drive motor being controllable to change the direction of rotation of said rollers.

6. A material handling vehicle, as set forth in claim 1, wherein said frame first side includes a first pair of spaced apart substantially parallel support members defining a first guideway, and said frame second side includes a second pair of spaced apart substantially parallel support members defining a second guideway, said first gate member being slidably disposed in the first guideway and said second gate member being slidably disposed in the second guideway.

7. A material handling vehicle, comprising:

a frame having first and second spaced apart sides;

means for supporting a load on said frame at a location between said first and second spaced apart sides, said load supporting means defining a supporting surface plane;

first means for blocking movement of the load on said load supporting means in a first direction transverse and in passing relationship relative to said first side, said first blocking means having a gate member, said first blocking means gate member having upper and lower end portions and being movably connected to the frame adjacent the frame first side, said upper end portion of the first blocking means gate member extending above the supporting surface plane at a first position of said first blocking means and being disposed beneath the supporting surface plane at a second position of the first blocking means;

second means for blocking movement of the load on said load supporting means in a second direction transverse and in passing relationship relative to the second side, said second blocking means having a gate member, said second blocking means gate member having upper and lower portions and being movably connected to the frame adjacent said frame second side, said upper end portion of the second blocking means gate member extending above the supporting surface plane at the first position of the second blocking means and being disposed beneath the supporting surface plane at the second position of the second blocking means;

power means for elevationally moving said first and second blocking means between the first position at which said load is blocked from side passing movement in said first and second directions on said load supporting means and the second position at which said load is free to move in said passing relationship in said first and second directions on said load supporting means;

a first sensing means for sensing the elevational position of the first blocking means gate member and delivering a first signal in response to the first blocking means gate member being at the first position and delivering a second signal in response to the first blocking means gate member being at the second position; and a second sensing means for sensing the elevational position of the second blocking means gate member and delivering a first signal in response to the second blocking means gate member being at the first position and delivering a second signal in response to the second blocking means gate member being at the second position, said first and second sensing means each include first and second inductive proximity sensors capable of delivering a light signal and receiving a reflection of the light signal, said first inductive proximity sensor of the first sensing means being located on the frame adjacent the lower end portion of the first blocking means gate member at the first position of the first gate member, said second inductive proximity sensor of the first sensing means being located on the frame adjacent the lower end portion of the first blocking means gate member at the second position of the first blocking means gate member, said first inductive proximity sensor of the second sensing means being located on the frame adjacent the lower end portion of the second blocking means gate member at the first position of the second blocking means gate member, and said second inductive proximity sensor of the second sensing means being located on the frame adjacent the lower end portion of the second blocking means gate member at the second position of the second blocking means gate member.

8. An automatic guided material handling vehicle, comprising:

a frame having first and second spaced apart sides;

a plurality of rollers rotatably connected to the frame and defining a supporting surface plane, said rollers being adapted to guide movement of a load supported on the rollers in a first direction transverse the first side and in a second direction transverse the second side;

a first gate member having upper and lower end portions and being connected to said frame at a location adjacent the first side;

a second gate member having upper and lower end portions and being connected to the frame at a location adjacent the second side;

a first power means for elevationally moving the first gate member between a first position at which the upper end portion of the first gate member extends elevationally above the supporting surface plane and a second position at which the upper end portion of the first gate member is elevationally below the supporting surface plane;

a second power means for elevationally moving the second gate member between a first position at which an upper end portion of the second gate member extends elevationally above the supporting surface plane and a second position at which the upper end portion of the second gate member is elevationally below the supporting surface plane, said first and second power means each include a tie rod and first and second spaced apart lever assemblies having first and second spaced apart end portions and a middle portion, and said first end portion of the first and second lever assemblies of the first power means being pivotally connected at spaced apart locations to the lower end portion of the first gate member, and said first end portion of the first and second lever assemblies of the second power means being pivotally connected at spaced apart locations to the lower end portion of the second gate member, said middle portion of the first and second lever assemblies of the first power means being pivotally connected to the frame at spaced apart locations on the frame adjacent the first gate member, and said middle portion of the first and second levers of the second power means being pivotally connected to the frame at spaced apart locations on the frame adjacent the second gate member, said tie rod of the first power means being connected to and between the second end portion of the first power means first and second levers, and said tie rod of the second power means being connected to and between the second end portion of the second power means first and second levers.

9. An automatic guided material handling vehicle as set forth in claim 8, wherein said first and second power means each include a linear actuator having a rod, a motor, and a housing pivotally connected to the frame, said rod of the first power means being slidably extensibly connected to the housing of the first power means and pivotally connected to said first lever assembly of the first power means, and said rod of the second power means being slidably extensibly connected to the housing of the second power means and pivotally connected to said first lever assembly of the second power means, said motor of the first power means being mounted on the housing of the first power means and drivingly connected to said rod of the first power means, and said motor of the second power means being mounted on the housing of the second power means and drivingly connected to said rod of the second power means.

10. An automatic guided material handling vehicle, as set forth in claim 8, wherein said frame first side includes a first pair of spaced apart substantially parallel support members defining a first guideway and said frame second side includes a second pair of spaced apart parallel support members defining a second guideway, said first gate member being slidably disposed in the first guideway and said second gate member being slidably disposed in the second guideway.

11. An automatic guided vehicle as set forth in claim 10, including:

a first pair of bearing pads disposed in the first guideway and connected to the first pair of support members, respectively;

a second pair of bearing pads disposed in the second guideway and connected to the second pair of support members, respectively, said first and second gate members being slidably guidably engaged with said first and second pair of bearing pads, respectively.

12. An automatic guided material handling vehicle, as set forth in claim 8, wherein said lower end portion of the first and second gates have a sensing edge, and including:

a first sensing means for sensing the elevational position of the first gate member sensing edge and delivering a first signal in response to the first gate member being at the first position and delivering a second signal in response to the first gate member being at the second position;

a second sensing means for sensing the elevational position of the second gate member sensing edge and delivering a first signal in response to the second gate member being at the first position and delivering a second signal in response to the second gate member being at the second position.

* * * * *

UNITED STATES PATENT AND TRADEMARK OFFICE
CERTIFICATE OF CORRECTION

PATENT NO. : 4,781,514

DATED : November 1, 1988

INVENTOR(S) : David A. Schneider

It is certified that error appears in the above-identified patent and that said Letters Patent is hereby corrected as shown below:

Column 10, Claim 1, line 58, after "end", insert --portion of the first--.

Column 10, Claim 1, line 59, before "spaced", insert --at a location on the first blocking means gate member--.

Signed and Sealed this

Fourth Day of July, 1989

*Attest:*

DONALD J. QUIGG

*Attesting Officer*      *Commissioner of Patents and Trademarks*